Jan. 12, 1960     E. V. SUNDT     2,921,264

PROTECTION SYSTEM FOR METERS OR THE LIKE

Filed Jan. 27, 1953

INVENTOR.
Edward V. Sundt
BY
Wallenstein & Spangenberg
attys.

United States Patent Office 2,921,264
Patented Jan. 12, 1960

2,921,264
PROTECTION SYSTEM FOR METERS OR THE LIKE

Edward V. Sundt, Wilmette, Ill., assignor to Sundt Engineering Company, Des Plaines, Ill., a corporation of Illinois Application January 27, 1953, Serial No. 333,421

6 Claims. (Cl. 324—110)

This invention relates to systems for protecting sensitive electrical meters or the like from current overloads.

The protection of sensitive electrical meters such as microammeters, millivoltmeters and the like from accidental overloads has long presented a serious problem. Common methods for protecting such meters are to have either a series resistor or fuses, or both, in the meter or test circuit. However, these resistors, or fuses, having a resistance value high enough for protection purposes, decrease the sensitivity of the meter and usually require a switching arrangement to short them out for actual measurement. In addition to the necessity for switching there is no protection afforded during the measurements. A vacuum tube protection circuit capable of automatic resetting and avoiding the necessity for switching has been proposed for limiting current flow through the meter, but it has failed to achieve wide usage because of the necessity for providing filament and screen grid voltages and the fact that it adds considerable series resistance in the meter or test circuit and also makes the meter reading non-linear.

The principal object of this invention is to provide an improved system for protecting sensitive electrical meters or the like in test or meter circuits from current overloads in said circuits wherein the aforementioned shortcomings of existing protection systems are eliminated or greatly minimized, which is rapid in response, which requires no switching, which does not materially affect the calibration of the meter or the like, which substantially eliminates the need for external electrical power, which is simple and foolproof in construction and operation and which is inexpensive to manufacture.

Briefly, the system of this invention for protecting a sensitive electrical meter or the like from current overloads in the test or meter circuit comprises a test circuit including the sensitive electrical meter or the like and a transistor having an emitter, a collector and a base. The meter is connected in the collector to base circuit of the transistor which extends between a pair of terminals which are to be connected into a direct current circuit to be measured, the transistor receiving its direct current operating voltage from the latter circuit through the pair of terminals. A relatively large current-limiting resistor and a source of direct current biasing voltage are connected in series between the emitter and base of the transistor to provide a substantially constant current flow therein during normal current flow in the collector circuit. With the proper selection of the value of the current-limiting resistor, the transistor acts as an automatic self limiter for the current flow through the meter and effectively prevents excessive current flow therethrough, but yet presents only relatively small resistance to the current flow during normal current flow conditions encountered during measurement.

The biasing voltage source for the current flow in the emitter circuit may be a small cell or battery, such as of the Mallory type, which has a very long life, a year or more, under a current drain of about 100 microamperes, which is the order of the current drain here involved. The voltage source for the current flow in the emitter circuit may alternatively be obtained from a biasing resistor in the collector circuit and thus the battery or cell may be entirely eliminated. The transistor may be of the point contact type or of the junction type, the latter probably giving somewhat better results.

Other objects of this invention reside in the details of construction of the protection system of this invention and in the cooperative relationships between the component parts thereof. Further objects of this invention will become apparent to those skilled in the art upon reference to the accompanying specification, claims and drawing in which:

Figure 1:
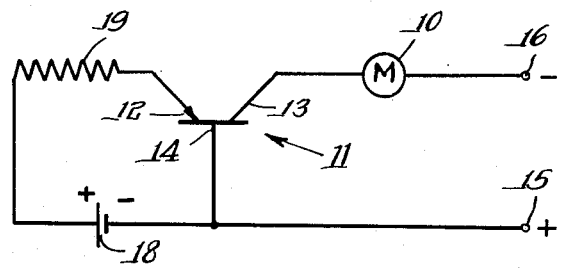
Figure 1 is a wiring diagram of one form of the protection system of this invention utilizing a point contact type transistor and a battery for producing the biasing current.

Referring first to Figure 1 the electrical meter or the like to be protected by the protection system of this invention is designated at 10. For purposes of illustration herein it may be a sensitive voltmeter. The electrical meter 10 is protected by a transistor generally designated at 11. Here the transistor may be a conventional point contact type transistor having an emitter 12, a collector 13 and a base 14. The electrical meter 10 located in the test or meter circuit may be utilized for measuring the voltage drop across terminals 15 and 16, the terminal 15 being the positive terminal and the terminal 16 being the negative terminal. The electrical meter 10 and the terminals 15 and 16 are connected in series in the collector circuit of the transistor 11, the circuit extending from the terminal 15 through the base 14 and the collector 13 of the transistor 11 and the electrical meter 10 to the terminal 16.

The current flow through the collector circuit and hence through the electrical meter is regulated by the current through the emitter circuit of the transistor 11. The emitter circuit of the transistor extends from the base 14 through a cell or battery 18 and a limiting resistor 19 to the emitter 12 of the transistor. The positive terminal of the cell or battery 18 is connected through the limiting resistor 19 to the emitter 12 and the negative terminal thereof is connected to the base 14. The battery or cell 18 causes a current flow through the emitter circuit which is limited by the limiting resistor 19 so as to permit a predetermined current flow in the collector circuit. When, however, the current flow through the collector circuit increases beyond a predetermined value as determined by the current flow in the emitter circuit, this being termed the cut off point of the transistor, the current flow through the collector circuit is limited and the excessive current flow interrupted. Thus, for desired current flows which are present during measurement operations, the transistor 11 passes the current so that the measurements thereof may be readily taken by the electrical meter 10. If, however, the current flow should become excessive beyond the current carrying capacity of the meter 10 then the transistor operates to interrupt that excessive current flow. In this respect the resistor operates as a current limiter for the electrical meter 10.

Figure 2:
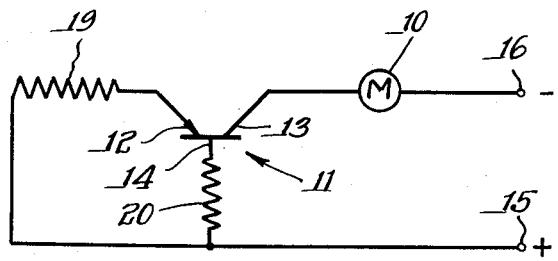
Figure 2 is a view similar to Figure 1 but showing another form of the invention wherein the biasing current is obtained from a biasing resistor.

The form of the invention illustrated in Figure 2 is very much like that illustrated in Figure 1 and like reference characters have been utilized for like parts. In Figure 2, however, a biasing resistor 20 is utilized for providing current flow in the emitter circuit in lieu of the battery or cell 18. Here, current flow in the collector circuit produces a voltage drop across the biasing resistor 20, the end of the biasing resistor 20 connected to the base 14 being negative with respect to the other end thereof. As a result a current in the proper direction is caused to flow in the emitter circuit for controlling the transistor 11. This emitter current flow is regulated or limited by the limiting resistor 19. The manner of operation of the arrangement of Figure 2 is like that of Figure 1.

Figure 3:
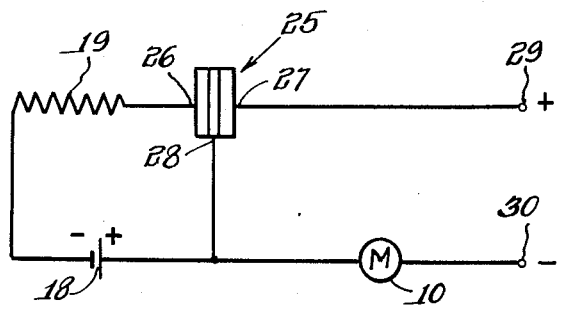
Figures 3 and 4 are views similar to Figures 1 and 2 respectively but showing other forms of the invention wherein junction type transistors are utilized.
Figure 4:
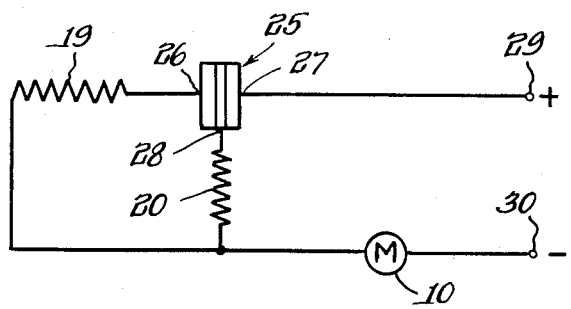

The forms of the invention illustrated in Figures 3 and 4 are very much like those illustrated in Figures 1 and 2 respectively and, accordingly, like reference characters have been utilized for like parts. The protection systems of Figures 3 and 4 differ from those of Figures 1 and 2 by utilizing a junction type transistor generally designated at 25 in lieu of the point contact type of transistor. Here, the junction type transistor 25 includes an emitter 26, a collector 27 and a base 28. The emitter 26 is connected to the limiting resistor 19. The collector 27 is connected to a positive terminal 29. The base 28 is connected through the electrical meter 10 to a negative terminal 30. The base 28 in Figure 3 is connected to the positive terminal of the battery or cell 18, the negative terminal of which is connected to the limiting resistor 19. In Figure 4 the biasing resistor 20 is connected to the base 28 and to the electrical meter 10 and the limiting resistor 19. It is noted that the polarities of the collector and emitter circuits of Figures 3 and 4 are reversed from those of Figures 1 and 2, this being necessary because of the different operating characteristics between the junction type transistor 25 and the point contact type transistor 11. Outside of this reversal of polarities the manner of operation of the forms of invention illustrated in Figures 3 and 4 is like that of the forms of invention illustrated in Figures 1 and 2.

As an example of the protection system of this invention, as illustrated in Figure 1, the meter 10 may be a voltmeter having a galvanometer movement with a curent sensitivity of about 200 microamperes, the battery 18 being a Mallory type cell, the current limiting resistor 19 being about 100 K., and the transistor 11 being a G.E. 611 point contact type transistor. The bias in the emitter circuit afforded by the battery and current limiting resistor amounts to about 140 microamperes which provides for long battery life. Under these conditions and accounting for the internal collector resistance of the transistor the voltmeter has a nominal voltage range of approximately 1.5 volts and it is protected within 5 times of its current limit, up to substantially 1,000 microamperes, for overvoltages as high as 16 volts. There is thus provided overvoltage protection of substantially 10 to 1 and this is accomplished with very little distortion to the linearity of response of the voltmeter.

In the form of the invention illustrated in Figure 2, wherein the biasing resistor 20 is utilized in lieu of the battery 18, the overvoltage protection is not quite so great nor is the linearity of response quite so good, but nevertheless satisfactory results for many measuring tasks are obtained, and this without the need for any external voltage source.

In the forms of the invention illustrated in Figures 3 and 4, wherein junction type transistors 25 are utilized in lieu of the point contact type transistors 11 in Figures 2 and 3, the overvoltage protection is considerably greater and there is far better linearity of response. This is occasioned by the fact that the junction type transistor has far better cut off characteristics than the point contact type of transistor. Here, overvoltage protection of substantially 40 to 1 may readily be obtained with substantially no distortion in linearity of response.

While for purposes of illustration several forms of this invention have been disclosed, other forms may become apparent to those skilled in the art upon reference to this disclosure.

I claim as my invention:

1. In combination with a circuit providing a direct current voltage drop across a pair of terminals, electrical measuring apparatus comprising a direct current meter connected in series with one of said terminals, and curent overload protecting means for protecting said meter against overload current, said protecting means including a transistor having emitter, collector and base electrodes, and a current limiting resistor having one end connected in series with said emitter electrode, said collector electrode and the other end of said resistor connected in series between said meter and the other of said pair of terminals to effect flow of current between said emitter and collector electrodes in the low impedance direction thereof, and direct current voltage biasing means connected in series with said current-limiting resistor and said base and emitter electrodes and arranged to effect flow of current between said emitter and base electrodes in the low impedance direction thereof, said current-limiting resistor being of a value which develops a voltage drop overcoming said biasing voltage when the voltage across said terminals reaches a value causing overload current to flow in said meter.

2. The combination of claim 1 wherein said current-limiting resistor, said voltage biasing means and the emitter and base electrodes form a first loop circuit, said pair of terminals, meter, collector and base electrodes forming a second loop circuit, the portion of said first loop circuit including said current-limiting resistor being completely outside of said second loop circuit.

3. The combination of claim 2 wherein said current-limiting resistor has a relatively large value providing substantially constant current flow in said first loop circuit during normal current flow through said meter.

4. The combination of claim 2 wherein said current-limiting resistor has a relatively large value and said voltage biasing means is a battery located externally of said second loop circuit.

5. The combination of claim 2 wherein said first and second loop circuits have a section in common, and said voltage biasing means comprising a resistor in said common section.

6. The combination of claim 1 wherein said collector and base electrodes are connected in series with the positive side of said meter.

References Cited in the file of this patent

UNITED STATES PATENTS 2,541,322    Barney _____ Feb. 13, 1951

OTHER REFERENCES

Publication I—Audio Engineering, October 1948, pp. 32, 33, 51, 52.

Publication II—The Transistor, by Bell Telephone Laboratories, Inc., copyright 1951, page 314.

Publication III—Radio and Television News, October 1948, pages 39, 181, 182, 183, 184.

Publication IV—Audio Engineering, August 1948, pages 28, 29, 39.

(Bell) The Transistor, by Bell Telephone Laboratories, Inc., copyright 1951, pages 369, 370, 350, 351.